United States Patent
Yokino et al.

(10) Patent No.: US 11,725,986 B2
(45) Date of Patent: Aug. 15, 2023

(54) SPECTROSCOPE AND SPECTROSCOPE PRODUCTION METHOD

(71) Applicant: HAMAMATSU PHOTONICS K.K., Hamamatsu (JP)

(72) Inventors: Takafumi Yokino, Hamamatsu (JP); Anna Yoshida, Hamamatsu (JP); Katsuhiko Kato, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/426,145

(22) PCT Filed: Jan. 28, 2020

(86) PCT No.: PCT/JP2020/003042
§ 371 (c)(1),
(2) Date: Jul. 28, 2021

(87) PCT Pub. No.: WO2020/158757
PCT Pub. Date: Aug. 6, 2020

(65) Prior Publication Data
US 2022/0099490 A1    Mar. 31, 2022

(30) Foreign Application Priority Data
Jan. 30, 2019   (JP) ................. 2019-014159

(51) Int. Cl.
*G01J 3/28*   (2006.01)
*G01J 3/02*   (2006.01)
*G01J 3/18*   (2006.01)

(52) U.S. Cl.
CPC .............. *G01J 3/28* (2013.01); *G01J 3/021* (2013.01); *G01J 3/0202* (2013.01); *G01J 3/18* (2013.01)

(58) Field of Classification Search
CPC ....... H01L 21/563; H01L 24/29; H01L 24/83; H05K 3/3436; G01J 3/28; G01J 3/0202; G01J 3/021; G01J 3/18
See application file for complete search history.

(56) References Cited

U.S. PATENT DOCUMENTS

2002/0033525 A1*  3/2002  Ohuchi ............... H05K 3/3463
                                                        257/679
2018/0224330 A1*  8/2018  Yoking ................ G01J 3/0208

FOREIGN PATENT DOCUMENTS

CN    105960578 A    9/2016
CN    105980820 A    9/2016
(Continued)

OTHER PUBLICATIONS

International Preliminary Report on Patentability dated Aug. 12, 2021 for PCT/JP2020/003042.

*Primary Examiner* — Tarifur R Chowdhury
*Assistant Examiner* — Alima Diawara Soumare
(74) *Attorney, Agent, or Firm* — Faegre Drinker Biddle & Reath LLP

(57) ABSTRACT

A spectrometer includes a support having a bottom wall part and a side wall part arranged on one side of the bottom wall part, a light detection element supported by the support to face a surface of the bottom wall part on the one side through a spectroscopic space, a resin molded layer provided at least on the surface of the bottom wall part on the one side, and a reflecting layer provided on the resin molded layer and included in an optical function part on the bottom wall part. The resin molded layer has a first part having a shape corresponding to the optical function part and a second part which surrounds the first part and is thinner than the first part.

14 Claims, 11 Drawing Sheets

(56) References Cited

FOREIGN PATENT DOCUMENTS

| | | |
|---|---|---|
| CN | 107850489 A | 3/2018 |
| CN | 107923795 A | 4/2018 |
| JP | 2002-118209 A | 4/2002 |
| JP | 2004-354176 A | 12/2004 |
| JP | 2010-256670 A | 11/2010 |
| JP | 2014-032155 A | 2/2014 |
| JP | 2015-148487 A | 8/2015 |
| JP | 2017-138320 A | 8/2017 |
| JP | 2018-109652 A | 7/2018 |
| WO | WO-2009/139327 A1 | 11/2009 |
| WO | WO 2012/108457 A1 | 8/2012 |
| WO | WO-2017022839 A1 * | 2/2017 ............ G01J 3/0205 |

* cited by examiner

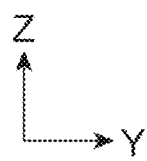
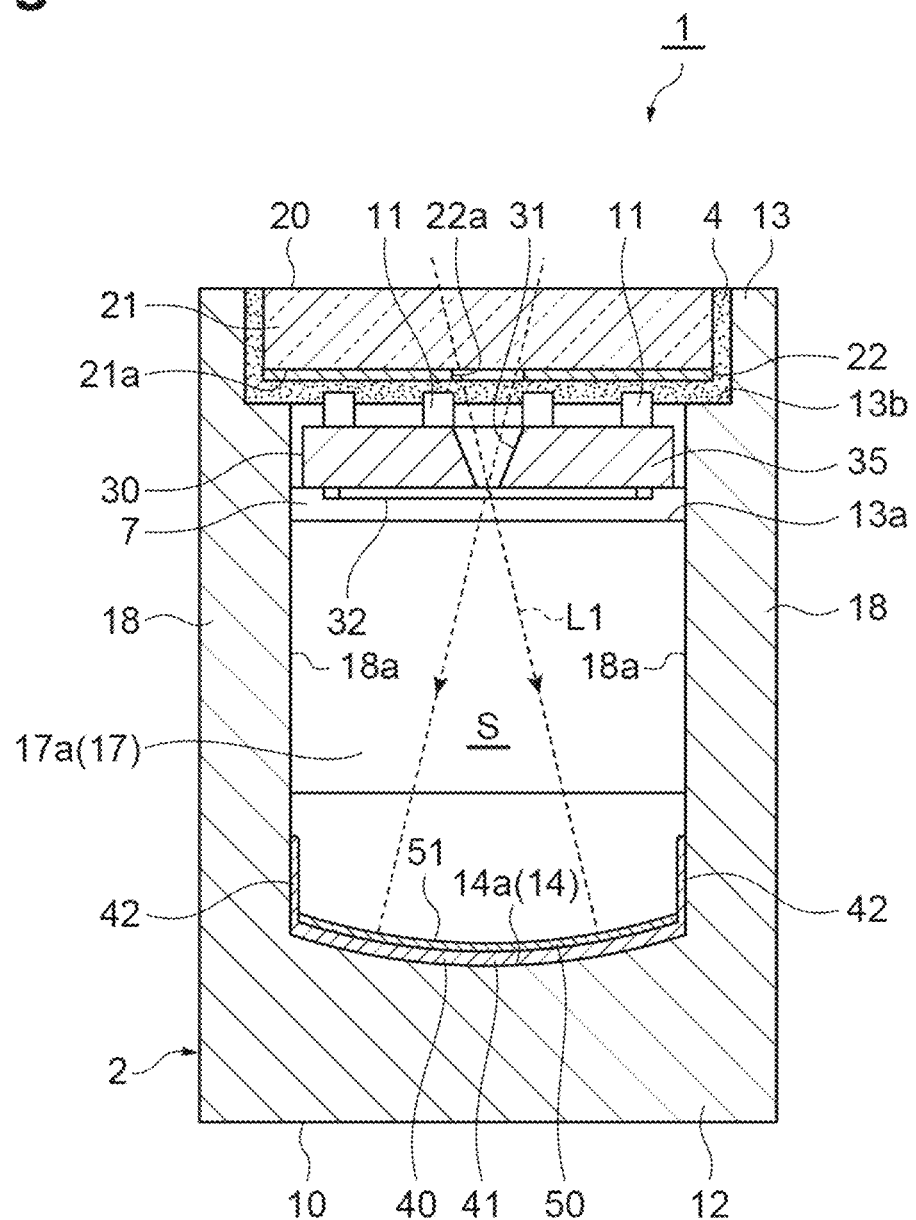

Fig.4 (a)
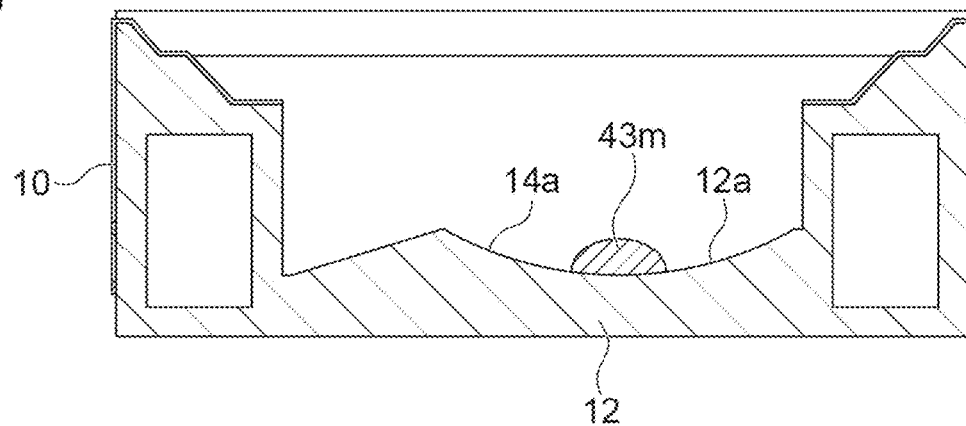
(b)
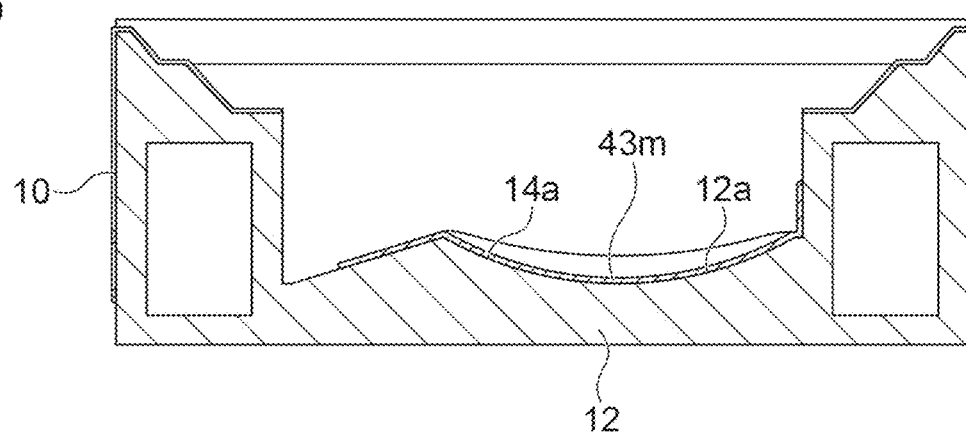
(c)
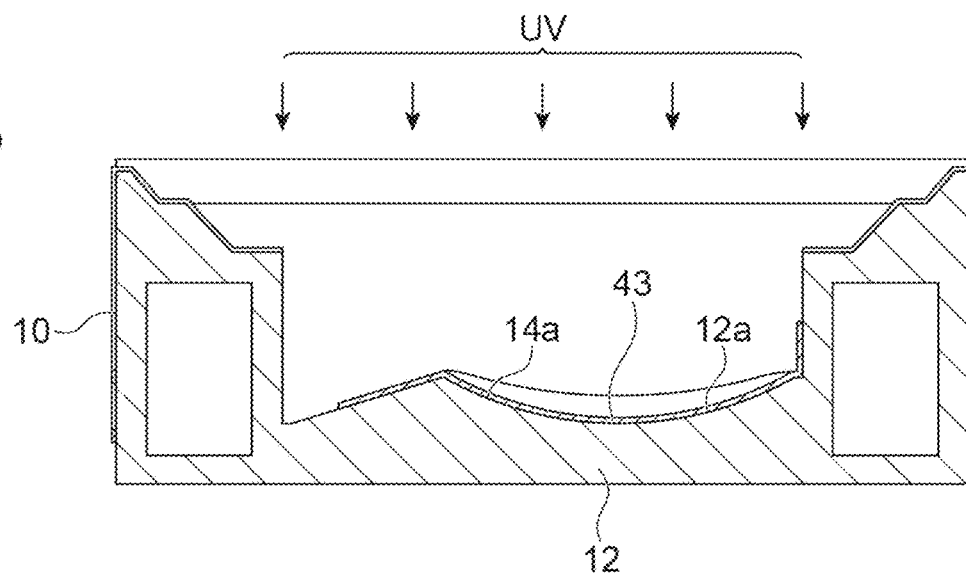

Fig.6
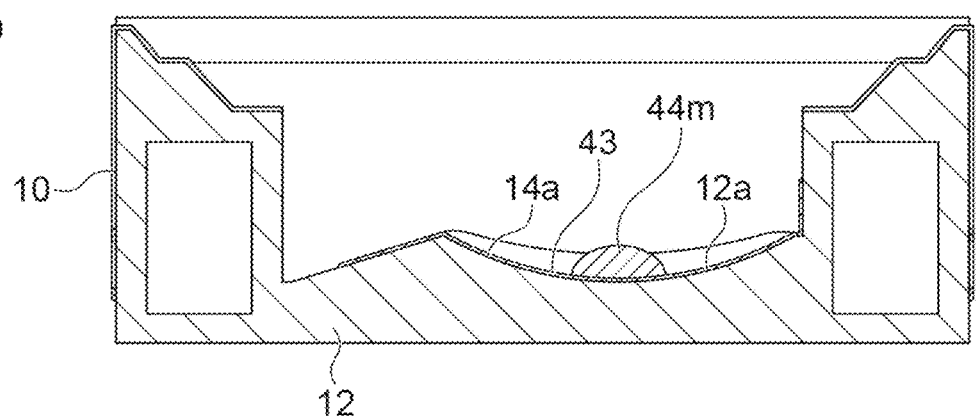
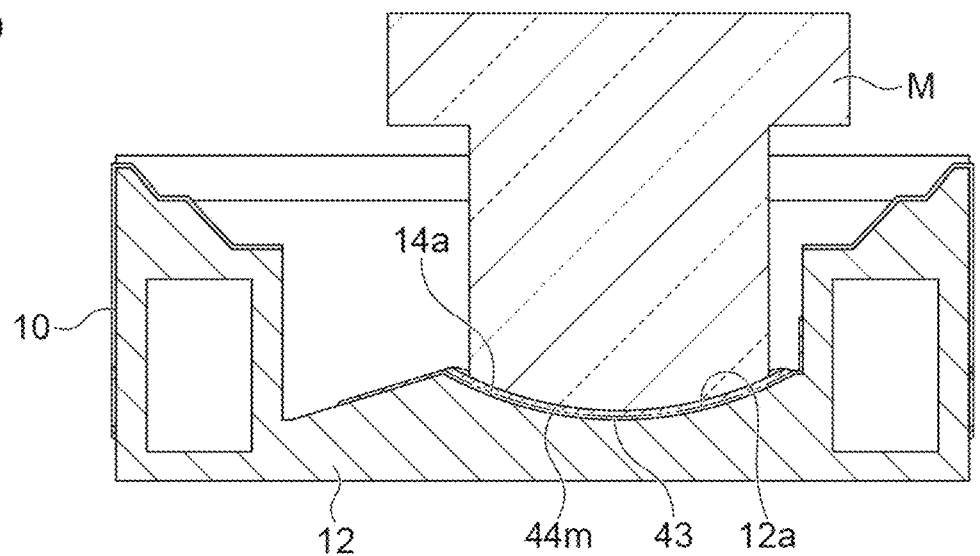
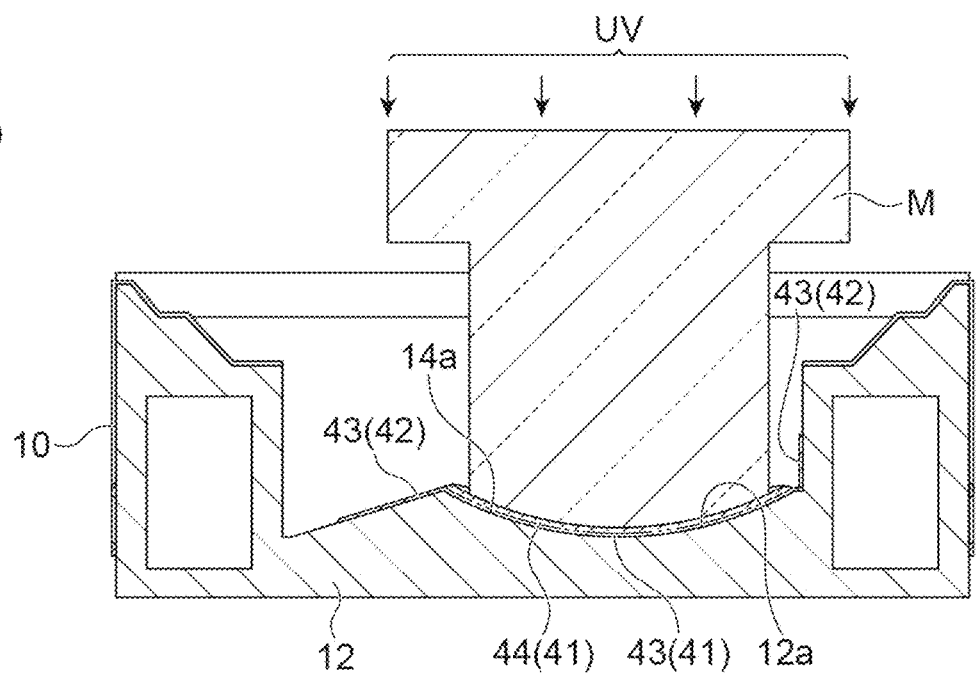

Fig.7
(a)
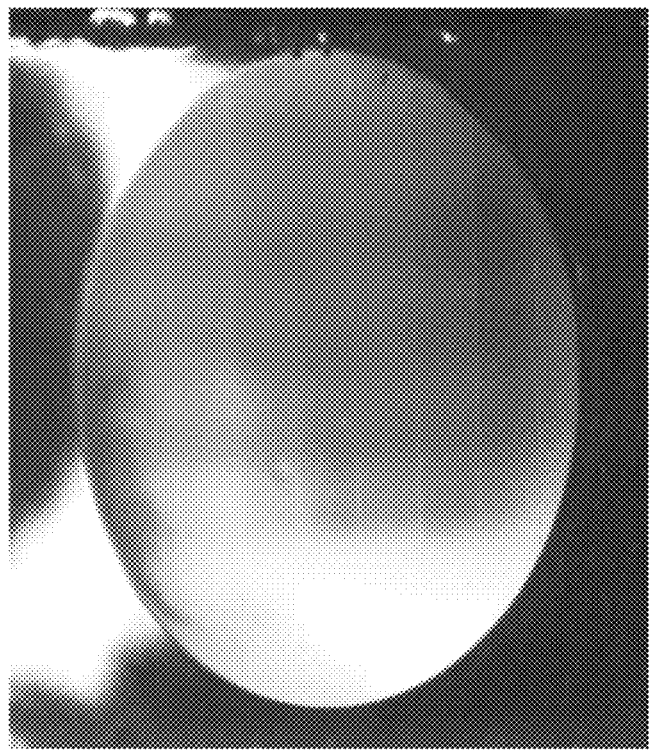
(b)
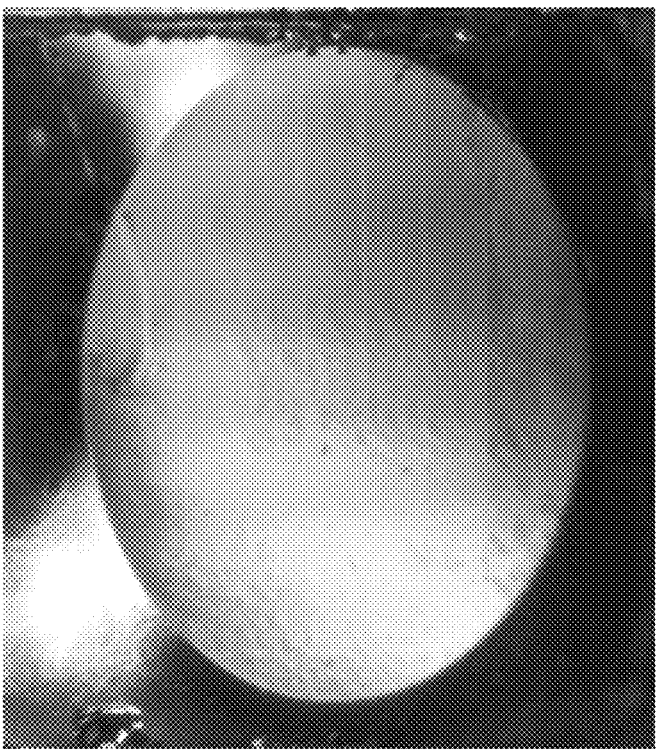

SPECTROSCOPE AND SPECTROSCOPE PRODUCTION METHOD

TECHNICAL FIELD

The present disclosure relates to a spectrometer and a method for manufacturing a spectrometer.

BACKGROUND ART

There has been a known spectrometer including a support, a dispersive part provided on a surface of a bottom wall part of the support, and a light detection element supported by a side wall part of the support to face the dispersive part (for example, see Patent Literature 1).

CITATION LIST

Patent Literature

Patent Literature 1: Japanese Unexamined Patent Publication No. 2004-354176

SUMMARY OF INVENTION

Technical Problem

In the spectrometer described above, the dispersive part may be formed as follows. That is, a resin material is arranged on the surface of the bottom wall part, the resin material is molded into a shape corresponding to the dispersive part by a mold die, and the resin material is cured to form a resin molded layer. Subsequently, a reflecting layer is formed on the resin molded layer to form the dispersive part.

In this case, when the resin molded layer is formed thin, an influence of a surface state of the bottom wall part appears on the resin molded layer, and as a result, spectroscopic accuracy may decrease. On the other hand, when the resin molded layer is formed thick, the amount of deformation of the resin molded layer due to a temperature change in a usage environment of the spectrometer increases, and as a result, the spectroscopic accuracy may decrease.

Therefore, an object of the disclosure is to provide a highly reliable spectrometer and a method for manufacturing such a spectrometer.

Solution to Problem

A spectrometer of an aspect of the disclosure includes a support having a bottom wall part and a side wall part arranged on one side of the bottom wall part, a light detection element supported by the support to face a surface of the bottom wall part on the one side through a spectroscopic space, a resin molded layer provided at least on the surface of the bottom wall part on the one side, and a reflecting layer provided on the resin molded layer and included in an optical function part on the bottom wall part, in which the resin molded layer has a first part having a shape corresponding to the optical function part and a second part which surrounds the first part and is thinner than the first part.

In this spectrometer, in the resin molded layer, the first part in which the reflecting layer is provided is surrounded by the second part thinner than the first part. In this way, an influence of a surface state of the bottom wall part is unlikely to appear, the amount of deformation due to a temperature change in a usage environment of the spectrometer is unlikely to increase, and the resin molded layer can be inhibited from being peeling off from the support by the second part thinner than the first part while ensuring a necessary and sufficient thickness in the first part. Therefore, according to the spectrometer, high reliability can be ensured.

In the spectrometer of the aspect of the disclosure, the resin molded layer may include a first resin layer formed at least on the surface of the bottom wall part on the one side and a second resin layer formed on the first resin layer, the first part may include the first resin layer and the second resin layer, and the second part may include the first resin layer. In this way, it is possible to reliably obtain the first part having a necessary and sufficient thickness as the shape corresponding to the optical function part and the second part that surrounds the first part and is thinner than the first part.

In the spectrometer of the aspect of the disclosure, the first resin layer may be thinner than the second resin layer. In this way, while ensuring a necessary and sufficient thickness allowing filling of the unevenness of the surface of the support and suppression of peeling from the support in the second part including the first resin layer, it is possible to ensure a necessary and sufficient thickness at which the amount of deformation due to a temperature change in the usage environment of the spectrometer is unlikely to increase in the first part including the first resin layer and the second resin layer.

In the spectrometer of the aspect of the disclosure, the optical function part may be a dispersive part. In this way, the dispersive part can appropriately exert a desired optical function.

In the spectrometer of the aspect of the disclosure, the optical function part may be a mirror. In this way, the mirror can appropriately exert a desired optical function.

In the spectrometer of the aspect of the disclosure, the first part may be provided on a concave curved surface in the surface of the bottom wall part on the one side. In this way, on the concave curved surface where proper resin molding is difficult, it is possible to reliably obtain the first part having a necessary and sufficient thickness as the shape corresponding to the optical function part.

In the spectrometer of the aspect of the disclosure, at least a portion of the second part may reach a boundary region between the surface of the bottom wall part on the one side and a surface of the side wall part on a side of the spectroscopic space. In this way, it is possible to reliably inhibit the resin molded layer from peeling off from the support.

In the spectrometer of the aspect of the disclosure, the at least the portion of the second part may reach the surface of the side wall part on the side of the spectroscopic space. In this way, it is possible to more reliably suppress peeling of the resin molded layer from the support.

In the spectrometer of the aspect of the disclosure, the side wall part may surround the spectroscopic space on the one side of the bottom wall part. In this way, it is possible to suppress entry of stray light into the spectroscopic space.

In the spectrometer of the aspect of the disclosure, a thickness of the first part may be 21 μm to 210 μm, and a thickness of the second part may be 1 μm to 10 μm. In this way, in the first part, it is possible to suppress appearance of the influence of the surface state of the bottom wall part and the increase in the amount of deformation due to the temperature change in the usage environment of the spectrometer, and in the second part, it is possible to suppress peeling of the resin molded layer from the support.

In the spectrometer of the aspect of the disclosure, a region in which a thickness of the resin molded layer changes may be present between the first part and the second part in the resin molded layer. In this way, in each of the first part and the second part, an appropriate thickness can be ensured.

In the spectrometer of the aspect of the disclosure, an area of the second part may be larger than an area of the first part. In this way, it is possible to more reliably suppress peeling of the resin molded layer from the support.

A method for manufacturing a spectrometer of an aspect of the disclosure includes a first process of preparing a support having a bottom wall part and a side wall part arranged on one side of the bottom wall part, a second process of arranging a first resin material on a surface of the bottom wall part on the one side, spreading the first resin material in a layer shape by heating, and curing the first resin material to form a first resin layer at least on the surface of the bottom wall part on the one side, a third process of arranging a second resin material on the first resin layer, molding the second resin material into a shape corresponding to an optical function part by a mold die, and curing the second resin material to form a second resin layer at least on the surface of the bottom wall part on the one side, a fourth process of forming a reflecting layer on the second resin layer, and a fifth process of supporting a light detection element by the support to face the surface of the bottom wall part on the one side through a spectroscopic space.

In this method for manufacturing the spectrometer, in the second resin layer having the shape corresponding to the optical function part, it is possible to suppress appearance of the influence of the surface state of the bottom wall part and the increase in the amount of deformation due to the temperature change in the usage environment of the spectrometer. Therefore, according to the method for manufacturing the spectrometer, it is possible to obtain the highly reliable spectrometer.

In the method for manufacturing the spectrometer of the aspect of the disclosure, in the second process, a spread state of the first resin layer may be adjusted by adjusting at least one of an amount of the first resin material, a heating temperature, and a heating time. In this way, it is possible to obtain the first resin layer having a desired thickness and area.

In the method for manufacturing the spectrometer of the aspect of the disclosure, the first resin material and the second resin material may be the same resin material. In this way, it is possible to obtain the stable resin molded layer.

Advantageous Effects of Invention

According to the disclosure, it is possible to provide a highly reliable spectrometer and a method for manufacturing such a spectrometer.

BRIEF DESCRIPTION OF DRAWINGS

FIG. 3 is a cross-sectional view of the spectrometer along line III-III illustrated in FIG. 1.

FIG. 4 is a diagram illustrating a second process of a method for manufacturing the spectrometer of the embodiment.

FIG. 6 is a diagram illustrating a third process of the method for manufacturing the spectrometer of the embodiment.

FIG. 7 is a diagram showing a photograph of a dispersive part of a spectrometer manufactured by a method of an example, and a photograph of a dispersive part of a spectrometer manufactured by a method of a comparative example.

DESCRIPTION OF EMBODIMENTS

Figure 1:
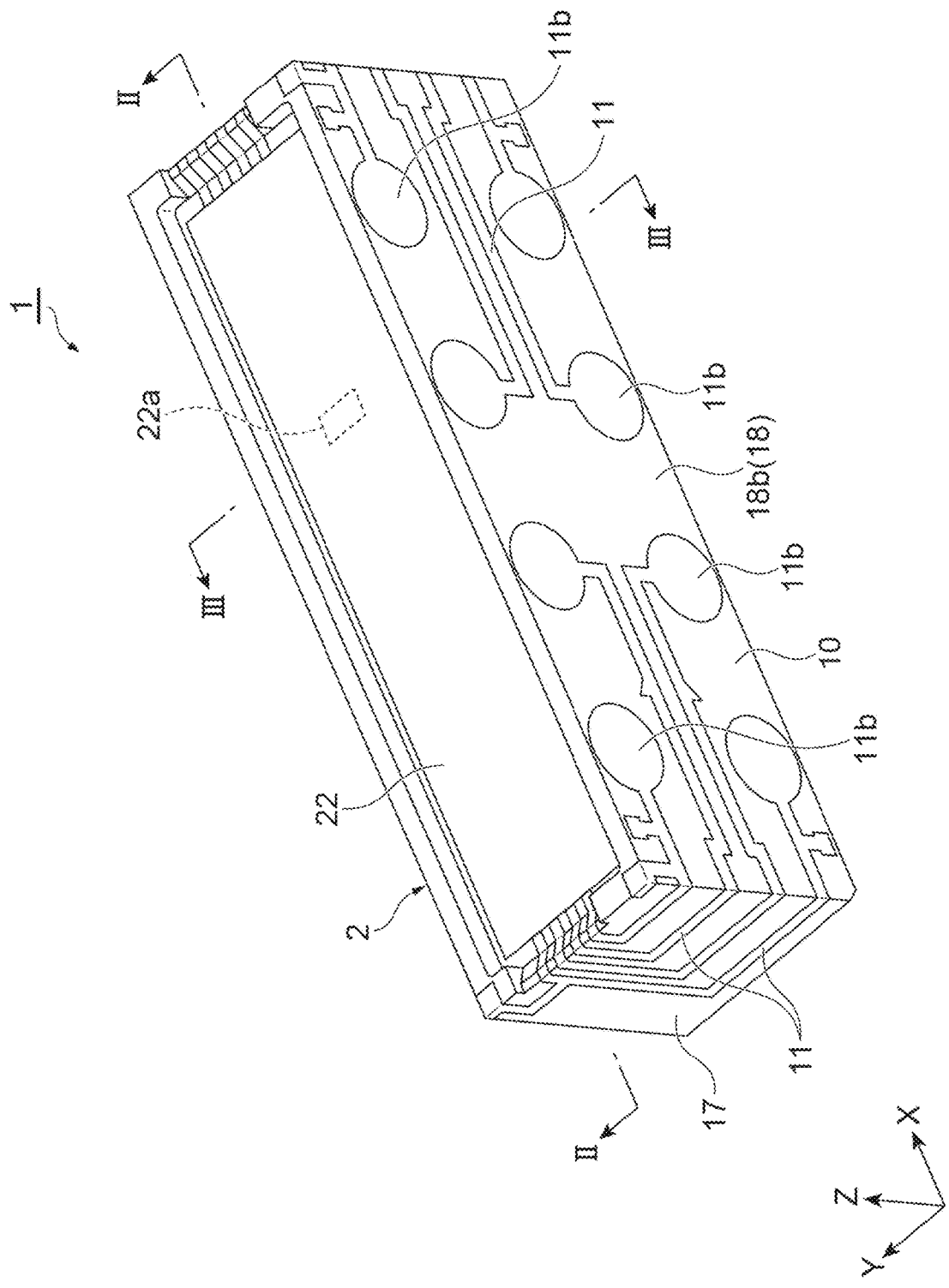
FIG. 1 is a perspective view of a spectrometer of an embodiment.

In the following, an embodiment of the disclosure will be described in detail with reference to the drawings. Note that in the drawings, the same or equivalent parts will be referred to with the same signs while omitting their overlapping descriptions.

[Configuration of Spectrometer]

As illustrated in FIG. 1, a spectrometer 1 includes a support 10 and a cover 20. In the spectrometer 1, a box-shaped package 2 includes the support 10 and the cover 20. The support 10 is configured as a molded circuit component (MID: molded interconnect device), and the support 10 is provided with a plurality of wirings 11. As an example, the spectrometer 1 has a rectangular parallelepiped shape having a length of 15 mm or less in each of an X-axis direction, a Y-axis direction, and a Z-axis direction. In particular, the spectrometer 1 is thinned to a length of about several mm in the Y-axis direction.

Figure 2:
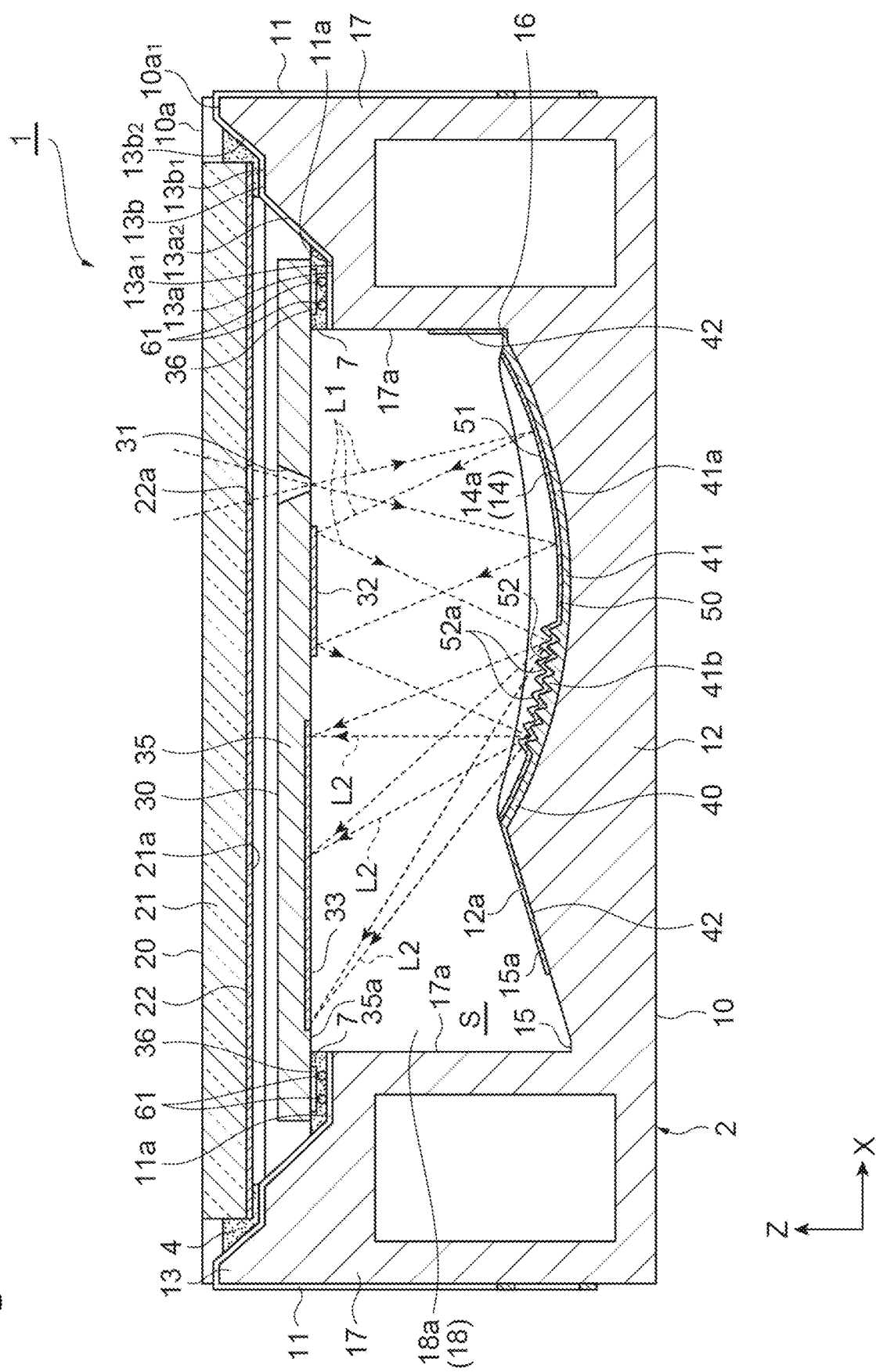
FIG. 2 is a cross-sectional view of the spectrometer along line II-II illustrated in FIG. 1.

As illustrated in FIG. 2 and FIG. 3, a light detection element 30, a resin molded layer 40, and a reflecting layer 50 are provided in the package 2. The reflecting layer 50 is included in a mirror 51 and a dispersive part 52 as an optical function part. The light detection element 30 is provided with a light passing part 31, a mirror 32, and a light detection part 33. The light passing part 31, the mirror 51, the mirror 32, the dispersive part 52, and the light detection part 33 are arranged on the same straight line parallel to the X-axis direction when viewed in the Z-axis direction.

In the spectrometer 1, light L1 passing through the light passing part 31 along the Z-axis direction is reflected by the mirror 51, and the light L1 reflected by the mirror 51 is reflected by the mirror 32. The light L1 reflected by the mirror 32 is dispersed and reflected by the dispersive part 52. In light dispersed and reflected by the dispersive part 52, light L2 other than zero-order light enters the light detection part 33 and is detected by the light detection part 33. As described above, in the spectrometer 1, a spectroscopic space S including an optical path of the light L1 from the light passing part 31 to the dispersive part 52 and an optical path of the light L2 from the dispersive part 52 to the light detection part 33 is formed in the package 2.

The support 10 has a bottom wall part 12 and a side wall part 13. The bottom wall part 12 and the side wall part 13 are integrally formed of, for example, a synthetic resin such as liquid crystal polymer (LCP). A depression 14 and peripheral parts 15 and 16 are provided on a surface 12a of the bottom wall part 12 on the spectroscopic space S side (on one side). The side wall part 13 is arranged on the spectroscopic space S side of the bottom wall part 12. The side wall part 13 surrounds the spectroscopic space S on the spectroscopic space S side of the bottom wall part 12. In the present embodiment, the side wall part 13 has a rectangular frame-like shape that surrounds the depression 14 and the peripheral parts 15 and 16 when viewed in the Z-axis direction. More specifically, the side wall part 13 has a pair of first side walls 17 and a pair of second side walls 18. The pair of first side walls 17 faces each other with the spectroscopic space S interposed therebetween in the X-axis direction when viewed in the Z-axis direction. The pair of second side walls 18 faces each other with the spectroscopic space S interposed therebetween in the Y-axis direction when viewed in the Z-axis direction.

A first widened part 13a and a second widened part 13b are provided in the side wall part 13. The first widened part 13a is a stepped part widened in the X-axis direction with respect to the spectroscopic space S on the opposite side from the bottom wall part 12 with respect to the spectroscopic space S (on one side of the spectroscopic space S). The second widened part 13b is a stepped part widened in each of the X-axis direction and the Y-axis direction with respect to the first widened part 13a on the opposite side from the bottom wall part 12 with respect to the first widened part 13a (on one side of the first widened part 13a). The second widened part 13b is an opening formed by the side wall part 13. One end part of each wiring 11 is arranged as a terminal 11a on a bottom surface of the first widened part 13a. As illustrated in FIG. 1, each wiring 11 reaches an outer surface 18b of one of the second side walls 18 from the first widened part 13a via the second widened part 13b and an outer surface of the first side wall 17. The other end part of each wiring 11 is arranged on the outer surface 18b as a terminal 11b.

As illustrated in FIG. 2, side surfaces $13a_2$ of first widened parts 13a facing each other in the X-axis direction are inclined to form obtuse angles with bottom surfaces $13a_1$ of the first widened parts 13a. Side surfaces $13b_2$ of second widened parts 13b facing each other in the X-axis direction are inclined to form obtuse angles with bottom surfaces $13b_1$ of the second widened parts 13b. As a result, the wirings 11 can be easily and accurately drawn, and the stress generated in the wirings 11 can be reduced. Further, a region $10a_1$ in which the wirings 11 are arranged on an end surface 10a of the support 10 on the opposite side from the bottom wall part 12 is recessed to the bottom wall part 12 side. As a result, for example, it is possible to prevent the wirings 11 from coining into contact with other members when the spectrometer 1 is mounted, and it is possible to reduce a length of the wirings 11.

As illustrated in FIG. 2 and FIG. 3, an inner surface of the depression 14 is a concave curved surface 14a. That is, the surface 12a of the bottom wall part 12 includes the concave curved surface 14a. In the present embodiment, the concave curved surface 14a is curved in a curved surface shape in each of the X-axis direction and the Y-axis direction. For example, the concave curved surface 14a has a shape corresponding to a part of a spherical surface. Each of the peripheral parts 15 and 16 is adjacent to the depression 14 in the X-axis direction. The peripheral part 15 is located on a side of one of the first side walls 17 with respect to the depression 14 when viewed in the Z-axis direction. The peripheral part 16 is located on a side of the other first side wall 17 with respect to the depression 14 when viewed in the Z-axis direction. The peripheral part 15 includes an inclined surface 15a. The inclined surface 15a is inclined to be away from the light detection element 30 along the Z-axis direction as the inclined surface 15a is away from the depression 14 along the X-axis direction.

The light detection element 30 is arranged in the first widened part 13a of the side wall part 13. The light detection element 30 is supported by the side wall part 13 so as to face the surface 12a of the bottom wall part 12 via the spectroscopic space S. The light detection element 30 has a substrate 35. The substrate 35 is formed in a rectangular plate shape by a semiconductor material (for example, silicon, etc.). The light passing part 31 is a light passing hole formed in the substrate 35. In the present embodiment, the light passing part 31 is a slit extending in the Y-axis direction, and an end part of the light passing part 31 on an entrance side of the light L1 widens toward the entrance side of the light L1 in each of the X-axis direction and the Y-axis direction. The mirror 32 is provided in a region between the light passing part 31 and the light detection part 33 on a surface 35a of the substrate 35 on the spectroscopic space S side. For example, the mirror 32 is a metal film made of Al, Au, etc. In the present embodiment, the mirror 32 is a flat mirror.

The light detection part 33 is provided on the surface 35a of the substrate 35. More specifically, the light detection part 33 is put in the substrate 35 made of the semiconductor material rather than being attached to the substrate 35. That is, the light detection part 33 includes a plurality of photodiodes formed in a first conductivity type region inside the substrate 35 made of the semiconductor material and a second conductivity type region provided within the region. For example, the light detection part 33 is configured as a photodiode array, a C-MOS image sensor, a CCD image sensor, etc., and has a plurality of light detection channels arranged along the X-axis direction. Lights L2 having different wavelengths are let into the respective light detection channels of the light detection part 33. The light detection part 33 is configured as a surface-incident photodiode, and a plurality of terminals 36 for inputting/outputting electric signals to/from the light detection part 33 is provided on the surface 35a of the substrate 35.

The terminal 36 of the light detection element 30 and the terminal 11a of the wiring 11 facing each other in the first widened part 13a are electrically and physically connected by, for example, a plurality of bumps (connecting members) 61 made of Au, solder, etc. A reinforcing member 7 made of resin is arranged between the light detection element 30 and the first widened part 13a so as to cover the plurality of bumps 61.

The cover 20 is arranged in the second widened part 13b of the side wall part 13. The cover 20 is separated from the light detection element 30. A joining member 4 made of resin is arranged between the cover 20 and the second widened part 13b. The cover 20 has a light transmitting member 21 and a light shielding layer 22. The light transmitting member 21 is formed in a rectangular plate shape using a material which transmits the light L1 therethrough (for example, silica, borosilicate glass (BK7), Pyrex (registered trademark) glass, Kovar glass, etc.). The light shielding layer 22 is provided on a surface 21a of the light transmitting member 21 on the spectroscopic space S side. A light transmitting opening 22a is formed in the light shielding layer 22 to oppose the light passing part 31 of the light detection element 30 in the Z-axis direction. In the present embodiment, the light transmitting opening 22a is a slit extending in the Y-axis direction. The cover 20 transmits the light L1 along the Z-axis direction through the light transmitting member 21 and the light transmitting opening 22a of the light shielding layer 22.

Note that when the light L1 is light in an infrared region, silicon, germanium, etc. are effective as a material of the light transmitting member 21. Further, the light transmitting member 21 may be provided with an anti reflection (AR) coat or may have a filter function for transmitting only light having a predetermined wavelength. Further, as the material of the light shielding layer 22, for example, black resist, Al, etc. can be used.

The resin molded layer 40 is provided at least on the surface 12a of the bottom wall part 12. The resin molded layer 40 is formed by curing a resin material, which is a molding material, in a predetermined shape (for example, photocuring by ultraviolet rays, etc., thermal curing, etc.).

The resin molded layer 40 has a first part 41 and a second part 42. The first part 41 is a part having a shape corresponding to the mirror 51 and the dispersive part 52, and is provided on the concave curved surface 14a in the surface 12a of the bottom wall part 12. More specifically, the first part 41 includes a part 41a having a shape corresponding to the mirror 51 and a part 41b having a shape corresponding to the dispersive part 52. In the present embodiment, the shape corresponding to the mirror 51 is a concave mirror pattern, and the shape corresponding to the dispersive part 52 is a grating pattern. The second part 42 is a part that surrounds the first part 41 and is thinner than the first part 41. In the present embodiment, the second part 42 reaches the inclined surface 15a on the surface 12a of the bottom wall part 12, an inner surface 17a of the first side wall 17 on the peripheral part 16 side, and an inner surface 18a of each second side wall 18, and does not reach an inner surface 17a of the first side wall 17 on the peripheral part 15 side. In this way, at least a portion of the second part 42 reaches a surface of the side wall part 13 on the spectroscopic space S side beyond a boundary region between the surface 12a of the bottom wall part 12 and the surface of the side wall part 13 on the spectroscopic space S side.

Note that the first part 41 may be provided on the entire surface 12a of the bottom wall part 12, and the second part 42 may not be provided on the surface 12a of the bottom wall part 12. Further, at least a portion of the first part 41 may reach the surface of the side wall part 13 on the spectroscopic space S side. That is, it is sufficient that the first part 41 may be provided at least on a portion of the surface 12a of the bottom wall part 12, and the second part 42 may be provided at least on the portion of the surface 12a of the bottom wall part 12 and the surface of the side wall part 13 on the spectroscopic space S side as long as the second part 42 is a part that surrounds the first part 41 and is thinner than the first part 41.

The first part 41 provided at least on the portion of the surface 12a of the bottom wall part 12 is a part that widens along a surface shape of the at least the portion. The second part 42 provided at least on a portion on the surface 12a of the bottom wall part 12 and the surface of the side wall part 13 on the spectroscopic space S side is, for example, a part that widens with a substantially uniform thickness along a surface shape of the at least the portion. In the resin molded layer 40, a region in which the thickness of the resin molded layer 40 changes is present between the first part 41 and the second part 42. An area of the second part 42 (an area of a part of the surface of the support 10 where the second part 42 widens) is larger than an area of the first part 41 (an area of a part of the surface of the support 10 where the first part 41 widens). In the present embodiment, the surface 12a of the bottom wall part 12 and the surface of the side wall part 13 on the spectroscopic space S side are connected to each other in a discontinuous state (a state of being physically separated from each other, a state of being connected to each other via an intersection between surfaces, etc.), and at least a portion of the second part 42 reaches the surface of the side wall part 13 on the spectroscopic space S side via a discontinuous part. Note that it is sufficient that at least the portion of the second part 42 reaches at least a portion on the surface of the side wall part 13 on the spectroscopic space S side. When at least the portion of the second part 42 reaches surfaces of a pair of side walls facing each other with the spectroscopic space S interposed therebetween (in the present embodiment, the pair of first side walls 17 and the pair of second side walls 18) on the surface of the side wall part 13 on the spectroscopic space S side, it is possible to suppress peeling of the resin molded layer 40, etc. In the present embodiment, a thickness of the first part 41 is 21 µm to 210 µm, and a thickness of the second part 42 is 1 µm to 10 µm. The thickness of the second part 42 is preferably ½ or less of the thickness of the first part 41, and more preferably ⅓ or less of the thickness of the first part 41. In this way, the overall thickness of the resin molded layer 40 can be suppressed, and the stress generated in the second part 42 in direct contact with the support 10 can be suppressed. As a result, the stress generated in the entire resin molded layer 40 can be suppressed. A numerical value related to the thickness of each of the first part 41 and the second part 42 is a numerical value when a surface in a state where unevenness of the surface of the support 10 is filled is set to 0. Note that when the thickness of the first part 41 (distance from the inner surface of the support 10 in each portion of the first part 41) changes, an average value thereof can be regarded as the thickness of the first part 41. Further, when the thickness of the second part 42 (distance from the inner surface of the support 10 in each portion of the second part 42) changes, an average value thereof can be regarded as the thickness of the second part 42.

The reflecting layer 50 is provided on the resin molded layer 40. The reflecting layer 50 is, for example, a metal film made of Al, Au, etc. The reflecting layer 50 forms the mirror 51 and the dispersive part 52 on the bottom wall part 12 by covering at least the first part 41 (more specifically, at least the parts 41a and 41b) of the resin molded layer 40. In the present embodiment, the mirror 51 is a concave mirror, and the dispersive part 52 is a reflection grating having a plurality of grating grooves 52a arranged along the X-axis direction. As described above, the mirror 51 and the dispersive part 52 are provided on the surface 12a of the bottom wall part 12 via the resin molded layer 40.

[Method for Manufacturing Spectrometer]

First, the support 10 is prepared (first process). Subsequently, as illustrated in (a) of FIG. 4, a first resin material 43m is arranged on the surface 12a (more specifically, the concave curved surface 14a) of the bottom wall part 12 (second process). In the present embodiment, the first resin material 43m is an ultraviolet curable resin. Subsequently, as illustrated in (b) of FIG. 4, the first resin material 43m is spread in a layer shape by heating. As an example, the first resin material 43m is spread in the layer shape by placing the support 10 on a hot plate heat to 100° C. for 5 minutes. When the first resin material 43m is heated, the viscosity of the first resin material 43m decreases, and the first resin material 43m spreads due to the capillary phenomenon so as to fill the unevenness on the surface of the support 10. Subsequently, as illustrated in (c) of FIG. 4, the first resin material 43m is cured by irradiation with ultraviolet rays to form the first resin layer 43 at least on the surface 12a of the bottom wall part 12 (second process).

Figure 5:
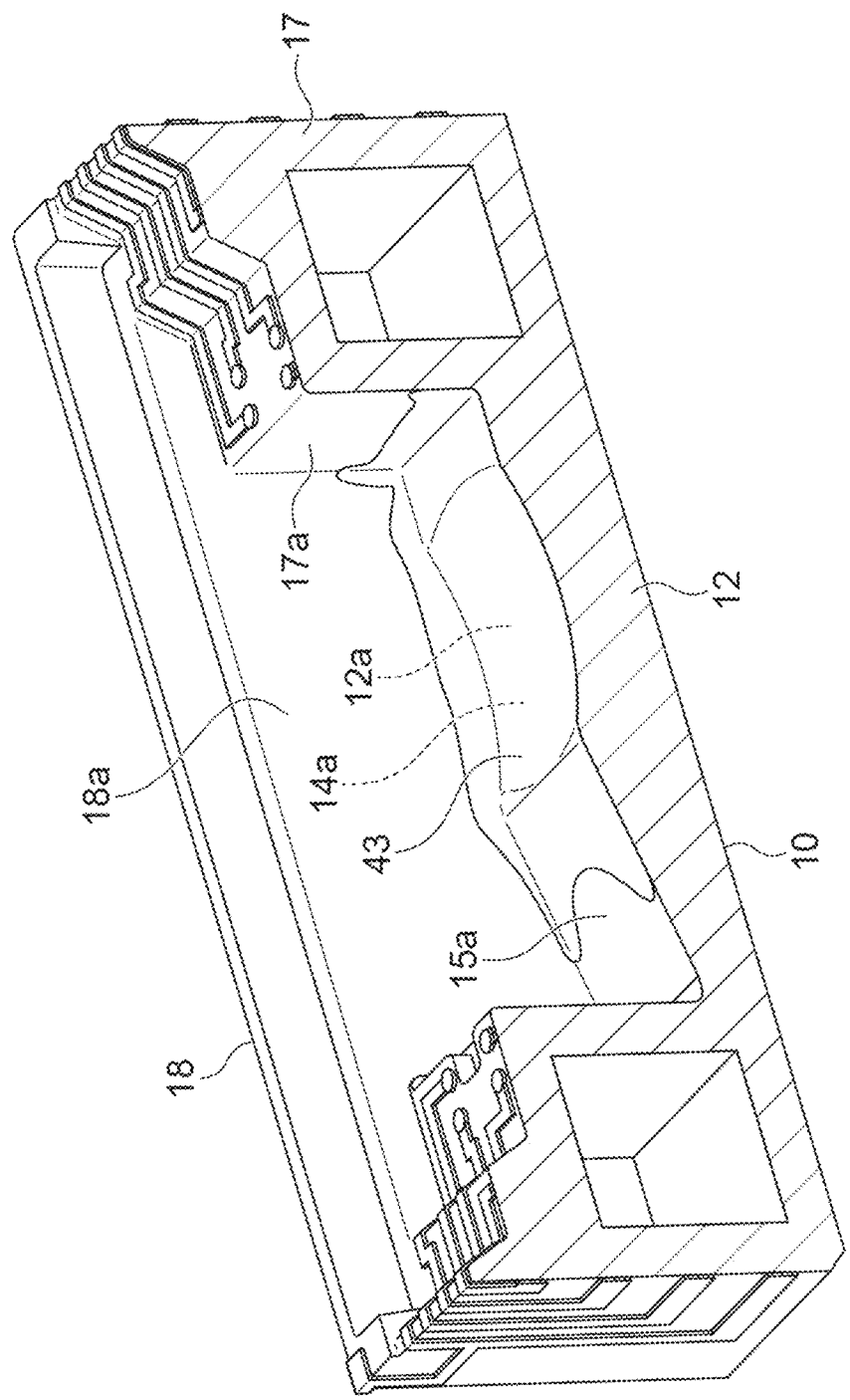
FIG. 5 is a perspective view of a support when the second process illustrated in FIG. 4 is completed.

In the second process, by adjusting at least one of the amount of the first resin material 43m, a heating temperature, and a heating time, a spread state of the first resin layer 43 (that is, the thickness, area, etc. of the first resin layer 43) is adjusted. For example, the area of the first resin layer 43 can be increased by increasing at least one of the amount of the first resin material 43m, the heating temperature, and the heating time. In the present embodiment, as illustrated in FIG. 5, the first resin layer 43 reaches the inclined surface 15a on the surface 12a of the bottom wall part 12, the inner surface 17a of the first side wall 17 on the peripheral part 16 side, and the inner surface 18a of each second side wall 18.

Subsequently, as illustrated in (a) of FIG. 6, the second resin material 44m is arranged on the first resin layer 43 (more specifically, on a part of the first resin layer 43 formed on the concave curved surface 14a) (third process). In the present embodiment, the second resin material 44m is the same ultraviolet curable resin as the first resin material 43m. Subsequently, as illustrated in (b) of FIG. 6, the second resin material 44m is molded into the shape corresponding to the mirror 51 and the dispersive part 52 (see FIG. 2) by the mold die M (third process). In the present embodiment, the mold die M has transparency to ultraviolet rays. As an example, the mold die M is stopped at a certain distance (21 µm to 210 µm) with respect to the surface 12a of the bottom wall part 12 (more specifically, the concave curved surface 14a). Subsequently, as illustrated in (c) of FIG. 6, the second resin material 44m is cured by irradiation with ultraviolet rays, and if necessary, heat curing is performed to form the second resin layer 44 at least on the surface 12a of the bottom wall part 12 (third process).

In the second process and the third process, the resin molded layer 40 includes the first resin layer 43 formed at least on the surface 12a of the bottom wall part 12 and the second resin layer 44 formed on the first resin layer 43. More specifically, the first part 41 of the resin molded layer 40 includes the first resin layer 43 and the second resin layer 44, and the second part 42 of the resin molded layer 40 includes the first resin layer 43. The first resin layer 43 is thinner than the second resin layer 44. The thickness of the first resin layer 43 is a thickness at which the unevenness on the surface of the support 10 can be filled, and is 1 µm to 10 µm. The thickness of the second resin layer 44 is a thickness that allows molding into the shape corresponding to the mirror 51 and the dispersive part 52, and is 20 µm to 200 µm. A numerical value related to the thickness of the first resin layer 43 is a numerical value when a surface in a state where the unevenness of the surface of the support 10 is filled is set to 0, and a numerical value related to the thickness of the second resin layer 44 is a numerical value when the surface of the first resin layer 43 is set to 0. Note that in the resin molded layer 40, a boundary between the first resin layer 43 and the second resin layer 44 may not be distinguished.

Subsequently, for example, the reflecting layer 50 is formed on the second resin layer 44 by evaporation of a metal material (fourth process). Subsequently, the light detection element 30 is supported by the side wall part 13 so as to face the surface 12a of the bottom wall part 12 via the spectroscopic space S (fifth process). Finally, the cover 20 is supported by the side wall part 13 to obtain the spectrometer 1.

[Action and Effect]

In the spectrometer 1, in the resin molded layer 40, the first part 41 in which the reflecting layer 50 is provided is surrounded by the second part 42 thinner than the first part 41. In this way, an influence of a surface state of the bottom wall part 12 is unlikely to appear, the amount of deformation due to a temperature change in a usage environment of the spectrometer 1 is unlikely to increase, and the resin molded layer 40 can be inhibited from being peeling off from the support 10 by the second part 42 thinner than the first part 41 while ensuring a necessary and sufficient thickness in the first part 41. Therefore, in the reflecting layer 50, the mirror 51 and the dispersive part 52 can appropriately exert a desired optical function. Therefore, according to the spectrometer 1, high reliability can be ensured.

In particular, since the spectrometer 1 is provided with a reflection type optical function part corresponding to the mirror 51 and the dispersive part 52, the surface shape of the support 10 has a greater influence on an optical characteristic of the optical function part when compared to a transmission type optical function part. Therefore, the resin molded layer 40 having the first part 41 and the second part 42 as described above is extremely effective in the spectrometer 1 in which the reflection type optical function part is provided.

Further, in the spectrometer 1, the first part 41 of the resin molded layer 40 includes the first resin layer 43 and the second resin layer 44, and the second part 42 of the resin molded layer 40 includes the first resin layer 43. In this way, it is possible to reliably obtain the first part 41 having a necessary and sufficient thickness as the shape corresponding to the mirror 51 and the dispersive part 52 and the second part 42 that surrounds the first part 41 and is thinner than the first part 41.

Further, in the spectrometer 1, the first resin layer 43 is thinner than the second resin layer 44. In this way, while ensuring a necessary and sufficient thickness allowing filling of the unevenness of the surface of the support 10 and suppression of peeling from the support 10 in the second part 42 including the first resin layer 43, it is possible to ensure a necessary and sufficient thickness at which the amount of deformation due to a temperature change in the usage environment of the spectrometer 1 is unlikely to increase in the first part 41 including the first resin layer 43 and the second resin layer 44.

Further, in the spectrometer 1, the first part 41 of the resin molded layer 40 is provided on the concave curved surface 14a on the surface 12a of the bottom wall part 12. In this way, on the concave curved surface 14a where proper resin molding is difficult, it is possible to reliably obtain the first part 41 having a necessary and sufficient thickness as the shape corresponding to the mirror 51 and the dispersive part 52.

Further, in the spectrometer 1, at least a portion of the second part 42 of the resin molded layer 40 reaches the surface of the side wall part 13 on the spectroscopic space S side (that is, the inner surfaces 17a and 18a). In this way, it is possible to reliably inhibit the resin molded layer 40 from peeling off from the support 10.

Further, in the spectrometer 1, the side wall part 13 surrounds the spectroscopic space S on the spectroscopic space S side of the bottom wall part 12. In this way, it is possible to suppress entry of stray light into the spectroscopic space S.

Further, in the spectrometer 1, the thickness of the first part 41 of the resin molded layer 40 is 21 µm to 210 µm, and the thickness of the second part 42 of the resin molded layer 40 is 1 µm to 10 µm. In this way, in the first part 41, it is possible to suppress appearance of the influence of the surface state of the bottom wall part 12 and the increase in the amount of deformation due to the temperature change in the usage environment of the spectrometer 1, and in the second part 42, it is possible to suppress peeling of the resin molded layer 40 from the support 10.

Further, in the spectrometer 1, in the resin molded layer 40, a region where the thickness of the resin molded layer 40 changes is present between the first part 41 and the second part 42. In this way, in each of the first part 41 and the second part 42, an appropriate thickness can be ensured. Further, since the thickness of the resin molded layer 40 gradually changes in the region and there is no abrupt change in thickness between the first part 41 and the second part 42, it is possible to suppress concentration of stress.

Further, in the spectrometer 1, the area of the second part 42 is larger than the area of the first part 41. In this way, it is possible to more reliably inhibit the resin molded layer 40 from peeling off from the support 10.

Further, in a method for manufacturing the spectrometer 1, in the second resin layer 44 having the shape corresponding to the mirror 51 and the dispersive part 52, it is possible to suppress appearance of the influence of the surface state of the bottom wall part 12 and the increase in the amount of deformation due to the temperature change in the usage environment of the spectrometer 1. Therefore, according to the method for manufacturing the spectrometer 1, it is possible to obtain the highly reliable spectrometer 1.

Further, in the method for manufacturing the spectrometer 1, in the second process, by adjusting at least one of the amount of the first resin material 43m, the heating temperature, and the heating time, the spread state of the first resin layer 43 is adjusted. In this way, it is possible to obtain the first resin layer 43 having a desired thickness and area.

Further, in the method for manufacturing the spectrometer 1, the first resin material 43m and the second resin material 44m are the same resin material. In this way, it is possible to obtain the stable resin molded layer 40.

In the spectrometer 1, considering that a difference in coefficient of thermal expansion from the light detection element 30 needs to be small, and the wirings 11 need to be formed, a degree of freedom in selecting the material of the support 10 is limited. Specifically, the material of the support 10 is limited to ceramics, etc. in addition to the synthetic resin described above. Compared to a semiconductor, glass, etc., these materials tend to have large surface unevenness (surface roughness). The large unevenness of the surface of the support 10 is effective in that adhesion of the resin molded layer 40 is improved. However, due to the large unevenness, the influence of the surface state of the support 10 appears on the resin molded layer 40, and an unnecessary striped pattern, distortion, etc. occur in the mirror 51 and the dispersive part 52. Further, the large unevenness of the surface of the support 10 causes voids to remain in the resin molded layer 40. Even when the support 10 having a smooth surface can be formed, the adhesion of the resin molded layer 40 may decrease. In the support 10, since the side wall part 13 is arranged on one side of the bottom wall part 12, it is difficult to form a uniform primer layer (a base layer for improving the adhesion of the resin molded layer 40) by coating and blowing. Under such circumstances, according to the above-described method for manufacturing the spectrometer 1, while alleviating the influence of the unevenness of the surface of the support 10 by the first resin layer 43, it is possible to prevent an unnecessary striped pattern, distortion, etc. from occurring in the mirror 51 and the dispersive part 52 by the second resin layer 44, and voids from remaining in the resin molded layer 40. Note that when the second resin layer 44 is merely formed directly and thickly on the surface 12a of the bottom wall part 12 without forming the first resin layer 43, voids tend to remain in the resin molded layer 40, and the amount of deformation of the resin molded layer 40 due to a temperature change in the usage environment of the spectrometer 1 tends to increase.

(a) of FIG. 7 is a photograph of the dispersive part 52 of the spectrometer 1 manufactured by a method of an example, and (b) of FIG. 7 is a photograph of the dispersive part 52 of the spectrometer 1 manufactured by a method of a comparative example. The method of the example is similar to the method for manufacturing the spectrometer 1 described above, and the first resin layer 43 was formed to have a thickness of 5 µm, and the second resin layer 44 was formed to have a thickness of 40 µm. The method of the comparative example is different from the method for manufacturing the spectrometer 1 described above only in that the first resin layer 43 was not formed, and the second resin layer 44 was formed to have a thickness of 40 µm. In the dispersive part 52 of the spectrometer 1 manufactured by the method of the example, as shown in (a) of FIG. 7, an unnecessary striped pattern, distortion, etc. did not occur. On the other hand, in the dispersive part 52 of the spectrometer 1 manufactured by the method of the example, as shown in (b) of FIG. 7, an unnecessary striped pattern, distortion, etc. occurred.

Figure 8:
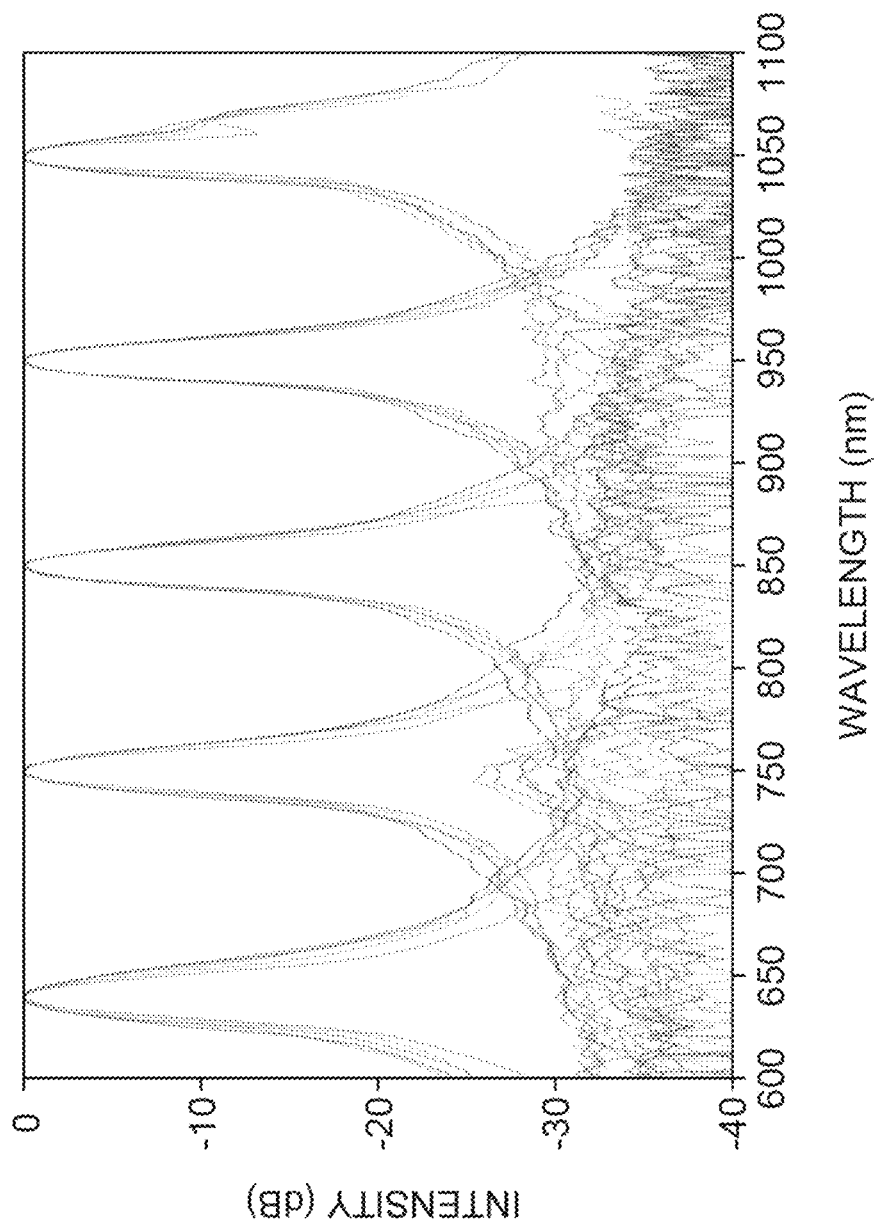
FIG. 8 is a diagram showing a spectral shape of the spectrometer manufactured by the method of the example.
Figure 9:
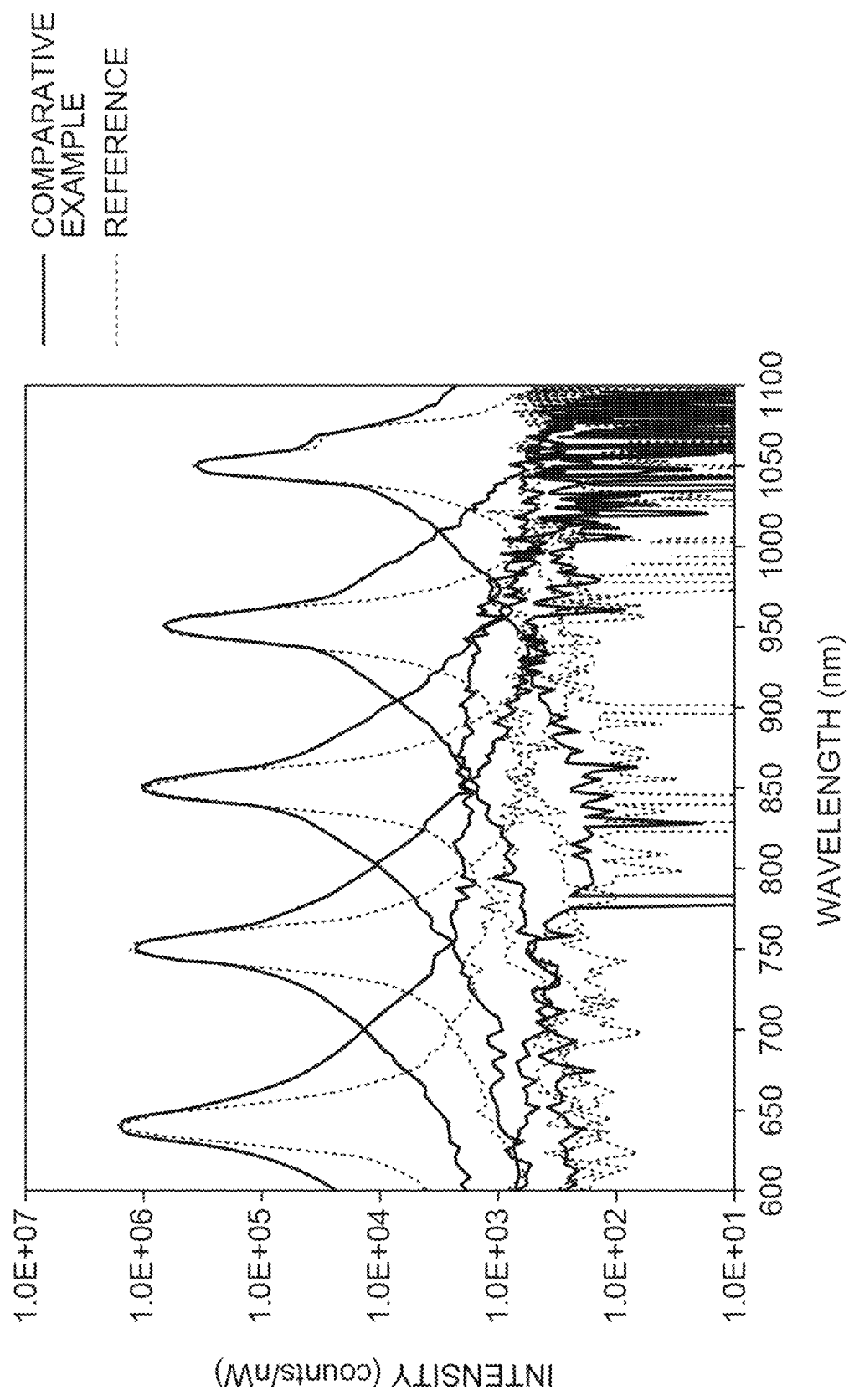
FIG. 9 is a diagram showing a spectral shape of the spectrometer manufactured by the method of the comparative example.

FIG. 8 is a diagram showing a spectral shape of the spectrometer 1 manufactured by the method of the example, and FIG. 9 is a diagram showing a spectral shape of the spectrometer 1 manufactured by the method of the comparative example. For the spectrometer 1 manufactured by the method of the example, as shown in FIG. 8, good spectral shapes were obtained for a plurality of samples. On the other hand, for the spectrometer 1 manufactured by the method of the comparative example, as shown in FIG. 9, compared to a spectral shape of a reference spectrometer 1 (ideal spectrometer 1), a tail of each peak value was widened, and a good spectral shape could not be obtained.

Modified Example

The disclosure is not limited to the embodiment described above. For example, the spectrometer 1 may further include a wiring unit including a flexible wiring board having a plurality of wirings. In this case, one end part of each wiring in the wiring unit is electrically and physically connected to the terminal 11b of each wiring 11 arranged on the outer surface 18b of the support 10 (see FIG. 1), and the other end part of each wiring in the wiring unit is configured, for example, as a connector. Further, the support 10 is not limited to that formed of a synthetic resin, and may be formed of, for example, a ceramic such as AlN or $Al_2O_3$. Further, the support 10 is not limited to that having the side wall part 13 having a quadrangular tubular shape, and may have the side wall part 13 having a polygonal tubular shape other than the quadrangular tubular shape, or the side wall part 13 having a circular tubular shape, an elliptical tubular shape, etc. Further, in the support 10, the side wall part 13 is not limited to one surrounding the spectroscopic space S on the spectroscopic space S side of the bottom wall part 12, and, for example, may be one having the pair of first side walls 17 and not having the pair of second side walls 18. Further, the side wall part 13 may not be provided with the first widened part 13a and the second widened part 13b. Further, the support 10 may not be provided with the wirings 11. In this case, a flexible wiring substrate provided separately from the support 10 may be electrically connected to the light detection element 30, or the light detection element 30 may be configured to be electrically connected to an external wiring. Further, in the support 10, an inner surface of the depression 14 provided on the surface 12a of the bottom wall part 12 is not limited to the concave curved surface 14a, and may include, for example, a flat bottom surface.

Further, in the light detection element 30, for example, a zero-order light capture part (for example, a light passing hole, etc. formed in the substrate 35) may be provided to be located between the mirror 32 and the dispersive part 52. In this way, in light dispersed and reflected by the dispersive part 52, zero-order light can be incident on the zero-order light capture part and captured by the zero-order light capture part. Further, the light detection element 30 may be supported by the support 10, for example, by being attached to another member attached to the support 10. As an example, the light detection element 30 may be supported by the side wall part 13 by being attached to a support member bridged by the side wall part 13. In this case, at least one of the light passing part 31, the mirror 32, and the zero-order light capture part may be provided on the support member. Further, for example, the light detection element 30 may be configured as a light detection unit together with the cover 20, the support member, etc. In this case, for example, the light detection element 30 may be electrically connected to the wirings provided on the cover 20, the support member, etc.

Further, the terminal 36 of the light detection element 30 and the terminal 11a of the wiring 11 facing each other in the first widened part 13a may be electrically and physically connected by a solder layer (connecting member). Further, the light detection part 33 may be configured as a backside incident type photodiode. In this case, since the plurality of terminals 36 is arranged on a surface of the substrate 35 on the opposite side from the surface 35a, the terminal 36 of the corresponding light detection element 30 and the terminal 11a of the wiring 11 may be electrically connected by a wire (connecting member). Further, for example, when a plurality of rays of the light L2 (a plurality of rays of the light L2 having different wavelengths) dispersed and reflected by the dispersive part 52 is sequentially incident on the light detection part 33 by configuring the dispersive part 52 so that the dispersive part 52 can move or swing, the light detection part 33 may be configured as a single element (having one light detection channel). In this case, the dispersive part 52 may be provided on the light detection element 30 side. As an example, the dispersive part 52 may be configured to be able to move or swing in the light detection element 30, configured to be able to move or swing in another member to which the light detection element 30 is attached, or configured to be able to move or swing in the cover 20.

Further, when the spectrometer 1 is configured such that the light L1 passing through the light passing part 31 is dispersed and reflected by the dispersive part, and the light L2 dispersed and reflected by the dispersive part is incident on the light detection part 33, the reflecting layer 50 may be included in the dispersive part as an optical function part. In this case, the first part 41 is a part having a shape corresponding to the dispersive part. That is, the first part 41 includes a part having the shape corresponding to the dispersive part. Further, when the spectrometer 1 is configured such that the light L1 passing through the light passing part 31 is reflected by a first mirror, the light L1 reflected by the first mirror is dispersed and reflected by the dispersive part, the light L2 dispersed and reflected by the dispersive part is reflected by a second mirror, and the light L2 reflected by the second mirror is incident on the light detection part 33, the reflecting layer 50 may be included in the first mirror and the second mirror as an optical function part. In this case, the first part 41 is a part having a shape corresponding to the first mirror and the second mirror. More specifically, the first part 41 includes a part having a shape corresponding to the first mirror and a part having a shape corresponding to the second mirror.

In the resin molded layer 40, the second part 42 may be contained inside the surface 12a of the bottom wall part 12. Even in this case, it is possible to reliably prevent the resin molded layer 40 from peeling off from the support 10. However, when at least a portion of the second part 42 reaches the boundary region between the surface 12a of the bottom wall part 12 and the surface of the side wall part 13 on the spectroscopic space S side, it is possible to more reliably inhibit the resin molded layer 40 from peeling off from the support 10.

Figure 10:
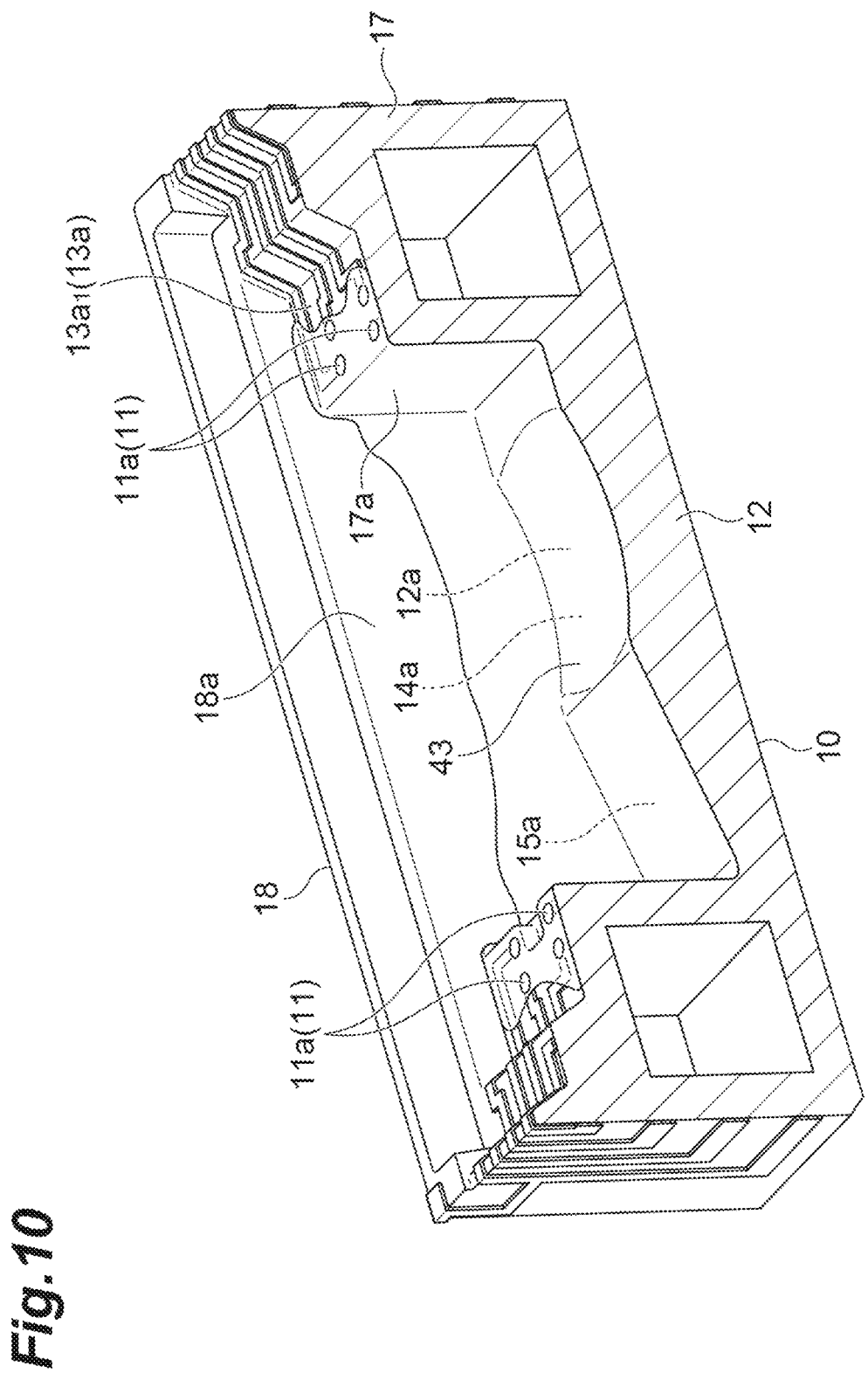
FIG. 10 is a perspective view of the support when the second process illustrated in FIG. 4 is completed.

Further, in the second process of the method for manufacturing the spectrometer 1, as illustrated in FIG. 10, the area of the first resin layer 43 may be increased by increasing at least one of the amount of the first resin material 43m, the heating temperature, and the heating time. In an example illustrated in FIG. 10, the first resin layer 43 reaches a bottom surface $13a_1$ of the first widened part 13a. However, the terminal 11a of each wiring 11 is not covered by the first resin layer 43. Note that as a device for preventing the first resin material 43m from reaching the bottom surface $13a_1$ of the first widened part 13a, a boundary region between the surface of the side wall part 13 on the spectroscopic space S side and the bottom surface $13a_1$ of the first widened part 13a is loosened, the boundary region is smoothened, or a depression or a projection is provided in the boundary region. However, when electric connection with the light detection element 30 is allowed, a part of the terminal 11a of each wiring 11 may be covered with the first resin layer 43. Further, when the terminal 11a of each wiring 11 is not arranged on the bottom surface $13a_1$ of the first widened part 13a, the first resin layer 43 may cover the entire bottom surface $13a_1$ of the first widened part 13a.

Figure 11:
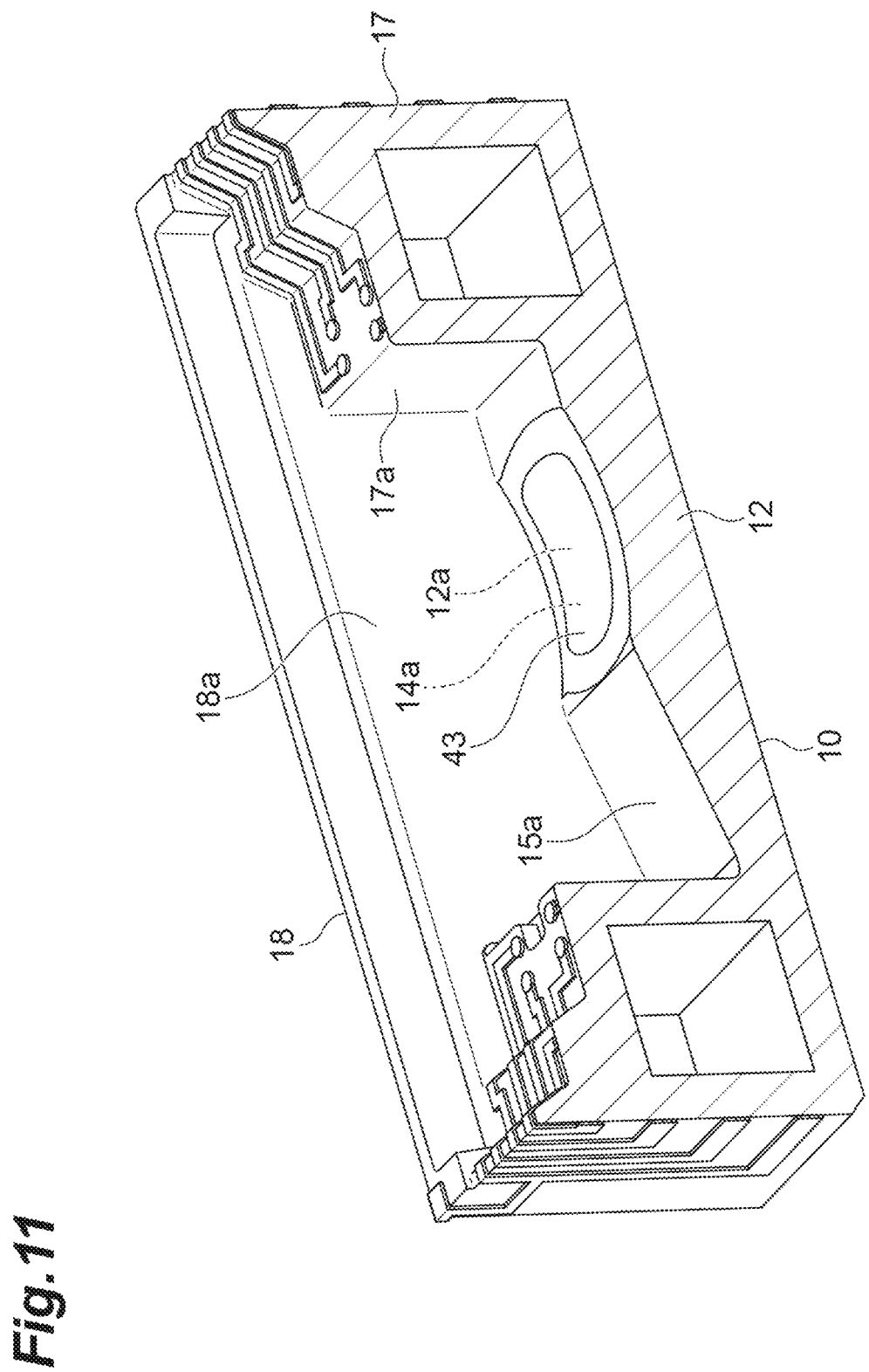
FIG. 11 is a perspective view of the support when the second process illustrated in FIG. 4 is completed.

Further, in the second process of the method for manufacturing the spectrometer 1, as illustrated in FIG. 11, the area of the first resin layer 43 may be decreased by decreasing at least one of the amount of the first resin material 43m, the heating temperature, and the heating time. In an example illustrated in FIG. 11, the first resin layer 43 is contained in the concave curved surface 14a. In this case, the first resin layer 43 may be completely covered by the second resin layer 44.

Further, in the second process of the method for manufacturing the spectrometer 1, a resin material whose viscosity is lowered by heating and which is cured by light irradiation, heating, etc. can be used as the first resin material 43m. Similarly, in the third process of the method for manufacturing the spectrometer 1, a resin material which can be molded by the mold die M and is cured by light irradiation, heating, etc. can be used as the second resin material 44m. Further, the first resin material 43m and the second resin material 44m may not be the same resin material. Further, the third process may be carried out a plurality of times.

Further, each configuration provided in the spectrometer 1 is not limited to the above-mentioned example of the material and shape, and various materials and shapes can be applied. In addition, each configuration in one embodiment or modified example described above can be arbitrarily applied to each configuration in another embodiment or modified example.

REFERENCE SIGNS LIST

1: spectrometer, 10: support, 12: bottom wall part, 12*a*: surface, 13: side wall part, 14*a*: concave curved surface, 17*a*: inner surface (surface), 18*a*: inner surface (surface), 30: light detection element, 40: resin molded layer, 41: first part, 42: second part, 43: first resin layer, 43*m*: first resin material, 44: second resin layer, 44*m*: second resin material, 50: reflecting layer, 51: mirror (optical function part), 52: dispersive part (optical function part), M: mold die, S: spectroscopic space.

The invention claimed is:

1. A spectrometer comprising:
a support having a bottom wall part and a side wall part arranged on one side of the bottom wall part;
a light detection element supported by the support to face a surface of the bottom wall part on the one side through a spectroscopic space;
a resin molded layer provided at least on the surface of the bottom wall part on the one side; and
a reflecting layer provided on the resin molded layer and included in an optical function part on the bottom wall part,
wherein the resin molded layer has a first part having a shape corresponding to the optical function part and a second part which surrounds the first part and is thinner than the first part,
the resin molded layer includes a first resin layer formed at least on the surface of the bottom wall part on the one side and a second resin layer formed on the first resin layer,
the first part includes the first resin layer and the second resin layer, and
the second part includes the first resin layer.

2. The spectrometer according to claim 1, wherein the first resin layer is thinner than the second resin layer.

3. The spectrometer according to claim 1, wherein the optical function part is a dispersive part.

4. The spectrometer according to claim 1, wherein the optical function part is a mirror.

5. The spectrometer according to claim 1, wherein the first part is provided on a concave curved surface in the surface of the bottom wall part on the one side.

6. The spectrometer according to claim 1, wherein at least a portion of the second part reaches a boundary region between the surface of the bottom wall part on the one side and a surface of the side wall part on a side of the spectroscopic space.

7. The spectrometer according to claim 6, wherein the at least the portion of the second part reaches the surface of the side wall part on the side of the spectroscopic space.

8. The spectrometer according to claim 1, wherein the side wall part surrounds the spectroscopic space on the one side of the bottom wall part.

9. The spectrometer according to claim 1, wherein a thickness of the first part is 21 μm to 210 μm, and a thickness of the second part is 1 μm to 10 μm.

10. The spectrometer according to claim 1, wherein a region in which a thickness of the resin molded layer changes is present between the first part and the second part in the resin molded layer.

11. The spectrometer according to claim 1, wherein an area of the second part is larger than an area of the first part.

12. A method for manufacturing a spectrometer comprising:
a first process of preparing a support having a bottom wall part and a side wall part arranged on one side of the bottom wall part;
a second process of arranging a first resin material on a surface of the bottom wall part on the one side, spreading the first resin material in a layer shape by heating, and curing the first resin material to form a first resin layer at least on the surface of the bottom wall part on the one side;
a third process of arranging a second resin material on the first resin layer, molding the second resin material into a shape corresponding to an optical function part by a mold die, and curing the second resin material to form a second resin layer at least on the surface of the bottom wall part on the one side;
a fourth process of forming a reflecting layer on the second resin layer; and
a fifth process of supporting a light detection element by the support to face the surface of the bottom wall part on the one side through a spectroscopic space.

13. The method for manufacturing the spectrometer according to claim 12, wherein in the second process, a spread state of the first resin layer is adjusted by adjusting at least one of an amount of the first resin material, a heating temperature, and a heating time.

14. The method for manufacturing the spectrometer according to claim 12, wherein the first resin material and the second resin material are the same resin material.

* * * * *